E. SCHMELZLE.
BAND SAW.
APPLICATION FILED JULY 17, 1914.
1,125,738.
Patented Jan. 19, 1915.
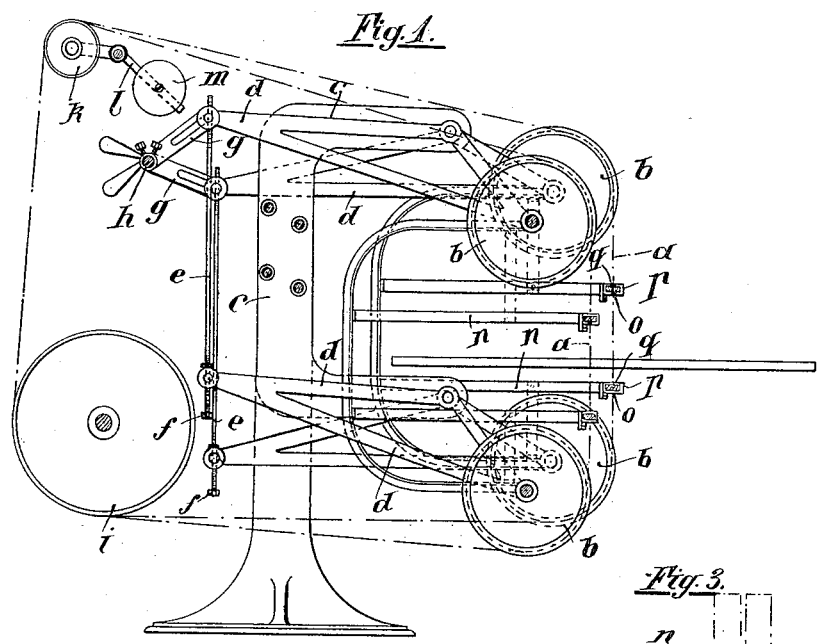
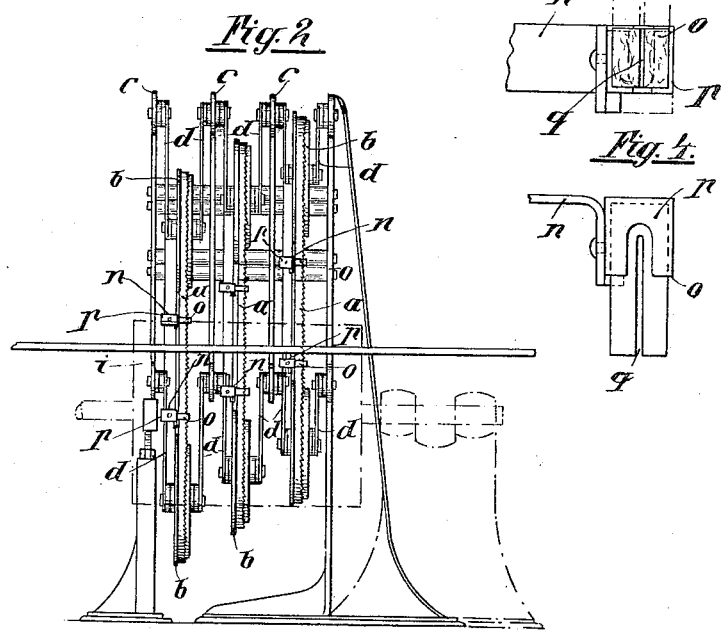
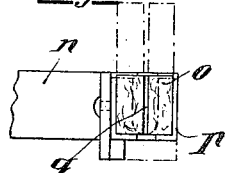
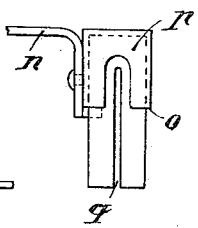
WITNESSES
Frank H Logan
John H Hosing
INVENTOR
ERNST SCHMELZLE
BY H van Oldenneel
ATTORNEY

UNITED STATES PATENT OFFICE.

ERNST SCHMELZLE, OF MITTELTAL, GERMANY.

BAND-SAW.

1,125,738.

Specification of Letters Patent. Patented Jan. 19, 1915.

Application filed July 17, 1914. Serial No. 851,516.

*To all whom it may concern:*

Be it known that I, ERNST SCHMELZLE, a citizen of the German Empire, residing at Mitteltal, in the Kingdom of Wurttemberg, Germany, have invented certain new and useful Improvements in Band-Saws; and I do hereby declare the following to be a full, clear, and exact description of the invention, such as will enable others skilled in the art to which it appertains to make and use the same.

Band saws with a number of independently adjustable saw blades are already known, in which the saw blades can be so adjusted in relation to one another by adjusting the different saw frames or the roller guides for the saws, that a number of planks of equal or of different thickness can be cut from one trunk or the like as the latter goes through the machine. In these known band saws, however, the changing of a saw blade is attended with considerable difficulty, for overcoming which it is necessary that the adjustability of the saw blades in relation to one another should be limited, if it be desired that the changing of a saw blade shall not involve the necessity of shifting the different band saw frames. The latter however, naturally implies a complete interruption of the working and consequently a considerable loss of time.

The present invention consists in a band-saw machine with a number of saw blades, which entirely obviates the above mentioned difficulties, because notwithstanding that the saw blades are adjustable within wide limits the arrangement adopted enables the different saw blades to be changed in the shortest possible time and without any troublesome preparatory work. For this purpose a single driving disk for all the saw blades, and a special tension roller for each single saw blade are arranged outside the band saw frame on which the saw rollers are seated, so that all that is necessary for changing a saw blade is that its tension roller should be released and the saw blade be exchanged. The upper and lower guide rollers of each single saw blade are suitably arranged on the machine frame. They are connected with one another and rotatively and adjustably arranged on the frame, so that for adjusting the saw blades in relation to one another all that is required is a suitable turning of pairs of levers.

The invention is illustrated in the drawing in one form by way of example.

Figure 1 is a transverse section of the novel band saw; Fig. 2 a front elevation of the same. Figs. 3 and 4 illustrate a guide for the saw blades on an enlarged scale.

The saw blades $a$ of the band saw are guided in the usual manner over two wheels $b$ which are mounted on ball or roller bearings on bent levers $d$ in the upper and lower parts of the machine frame $c$. The free ends of the other arms of the bent levers $d$ are connected with one another by means of a rod $e$ or the like, which can be adjusted by means of a nut $f$. For adjusting the different bent levers $d$ a lever $g$ is employed which is arranged on a shaft $h$ that is fixed on the machine frame $c$.

According to the invention, the saw blades $a$ are actuated by one and the same driving pulley $i$, which is arranged outside the machine frame $c$. Beyond this a tension roller $k$ for each single saw blade is arranged outside the frame $c$. This roller is seated on a bent lever $l$, which is loaded with a weight $m$ or the like and keeps the saw blade always under the right tension.

For guiding the saw blades $a$ of each single band saw, bent metal guides $n$ are arranged on the bent levers $d$. In front of each of these is an adjustable slot guide $o$ for the saw blade. This slot guide $o$ consists of a sleeve $p$ that pivots around the bent metal guide $n$. In this sleeve a piece of wood or the like is inserted in which the slot $q$ for the passage of the saw blade is formed. While the saw blades are being put on, the guide $o$ can be turned back and be put in the proper position again when the saw blades have been fixed.

In other respects the machine may be constructed as may be preferred.

What I claim and desire to secure by Letters Patent is:—

1. In a band-saw machine, the combination of a frame; pairs of levers fulcrumed thereon; a wheel on each lever; a yieldable tension roller for each pair of levers; and a band-saw disposed about the outer part of each tension roller and the wheels of the corresponding pair of levers.

2. In a band-saw machine, the combination of a frame; pairs of levers fulcrumed thereon; a wheel on each lever; a yieldable tension roller for each pair of levers; and a band-saw disposed about the outer part of each tension roller and the wheels of the corresponding pair of levers, said wheels and rollers being outside of the actual frame of the machine.

3. In a band-saw machine, the combination of a frame; a plurality of levers adjustably fulcrumed thereon one above the other in pairs side-by-side; wheels on said levers; a driving pulley; displaceable tension rollers, one for each pair of levers; and band-saws disposed around the outer part of said wheels, rollers and pulley, said wheels, rollers and pulley being outside of the actual frame of the machine.

4. In a band-saw machine, the combination of a frame; a pair of levers fulcrumed thereon; a wheel on each lever; a rod having its opposite ends directly pivoted to said levers respectively; and band-saws disposed about said wheels.

5. In a band-saw machine, the combination of a frame; a plurality of levers adjustably fulcrumed thereon one above the other in pairs side-by-side; wheels on said levers; a driving pulley; displaceable tension rollers, one for each pair of levers; and band-saws disposed around the outer part of said wheels, rollers and pulley.

6. In a band-saw machine, the combination of a frame; a plurality of levers fulcrumed thereon one above the other in pairs arranged side-by-side; wheels on said levers; rods pivoted to the levers and linking and holding in parallelism the levers of said pairs; a driving pulley; a plurality of yieldably supported tension rollers, one for each pair of levers; band-saws disposed over said wheels, rollers and pulley; and means for adjusting the levers.

7. In a band-saw machine, the combination of a frame; a plurality of levers fulcrumed, at their intermediate part, on said frame one above the other in at least three pairs movably disposed side-by-side; wheels mounted near the ends of said levers at one side of the frame; a drive pulley at the other side of the frame; yieldably supported tension rollers; band-saws disposed on said wheels, rollers and pulley; and rods pivotally connected to said levers at the ends away from said wheels and linking together the levers of each of said pairs.

8. In a band-saw machine, the combination of a frame; a plurality of levers fulcrumed at their intermediate part on said frame, one above the other in pairs movably disposed side-by-side in parallel planes; wheels rotatably mounted on the ends of said levers at one side of the frame; a drive pulley at the other side of the frame; tension rollers, one corresponding to each pair of levers and the wheels thereon, yieldably disposed above said drive pulley; a band-saw disposed about the drive pulley, each tension roller and the corresponding wheels; rods linking together the levers of each pair at the ends not carrying the wheels and disposed substantially within the space bounded by the band-saws; means for angularly adjusting each pair of levers and guides carried by the levers for guiding the saws.

In testimony whereof I affix my signature, in presence of two witnesses.

ERNST SCHMELZLE.

Witnesses:
  GEORG HANSCHMANN,
  FRIDA KLAIBER.

Copies of this patent may be obtained for five cents each, by addressing the "Commissioner of Patents, Washington, D. C."